June 24, 1947.  E. L. ROBERTS  2,422,987
STORAGE WAREHOUSE PROVIDING FOR THE DISSIPATION OF
MOISTURE RELEASED FROM STORED DEHYDRATED FRUITS
Filed Feb. 12, 1944

Inventor
Earle L. Roberts
By
Attorneys

Patented June 24, 1947

2,422,987

UNITED STATES PATENT OFFICE 2,422,987

STORAGE WAREHOUSE PROVIDING FOR THE DISSIPATION OF MOISTURE RELEASED FROM STORED DEHYDRATED FRUITS

Earle L. Roberts, Modesto, Calif.

Application February 12, 1944, Serial No. 522,102

1 Claim. (Cl. 98—29)

This invention relates to storage warehouses and particularly to one for keeping perishable food products, such as dehydrated fruits and the like.

After fruits have been dehydrated, it is sometimes necessary to store the same for a certain period before packaging them for shipment, and it has heretofore been considered that any ordinary dry storage place was adequate for the purpose. The resultant whitish coating almost inevitably appearing sooner or later on the surface of the fruit when thus stored was considered to be a natural exudation of sugar.

I have found, however, that such products, even after apparently being thoroughly dehydrated, still give off moisture and "sweat" for a certain time, and this causes the sugar to form on the outside. This formation or coating, however, is in fact a form of mold rather than sugar. This form of mold feeds on carbohydrates, and must have moisture to do it. Also, oxidation is faster in moist air.

To avoid this objectionable feature, the principal object of my present invention is to provide a storage warehouse for the purpose so constructed that a perfectly dry and cool atmosphere will be retained in the storage area of the warehouse for an indefinite period and without the use of any artificial drying or air conditioning agent, and without any expense for upkeep and operation, except possibly during abnormal weather conditions. Also, any sweat forming on the produce is carried away as it exudes from the produce and before it settles thereon in the form of the aforementioned coating.

A further object is to provide for the construction of the warehouse from standard and easily obtainable materials and so that the natural external heat is utilized in maintaining the necessary dry and cool condition within the warehouse.

Besides serving to keep dehydrated products, fresh untreated products can also be kept in good condition for a relatively long time without spoiling.

A further object of the invention is to produce a simple and inexpensive warehouse and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views.

Referring now more particularly to the characters of reference on the drawings, the warehouse comprises lower wall portions 1 and a floor 2, constructed so as to be both waterproof and heat insulated, and having water-and-air-tight connection with each other. I find that thick waterproof concrete meets these conditions.

The floor particularly, however, if resting on the ground, must be especially treated for thorough resistance to moisture penetration, and to attain this end, the base on which the concrete is poured is first covered with a coating of road oil, with a layer of building felt superimposed thereon; the concrete being then poured onto the felt.

Figure 2:
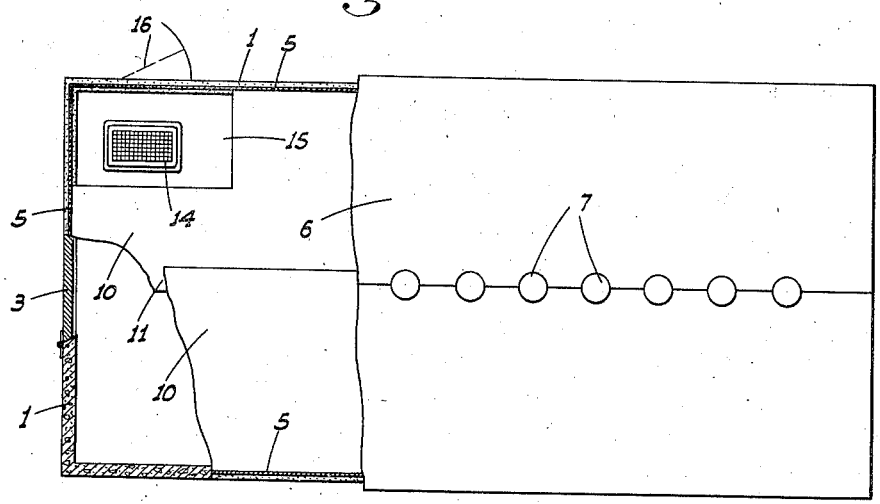
Figure 2 is a top plan view, partly broken away and in section.

The entry door 3 to the warehouse must also be waterproofed and heat insulated and arranged so that when closed, it has an air-tight fit with the wall in which the door is located, as indicated in Fig. 2.

Figure 1:
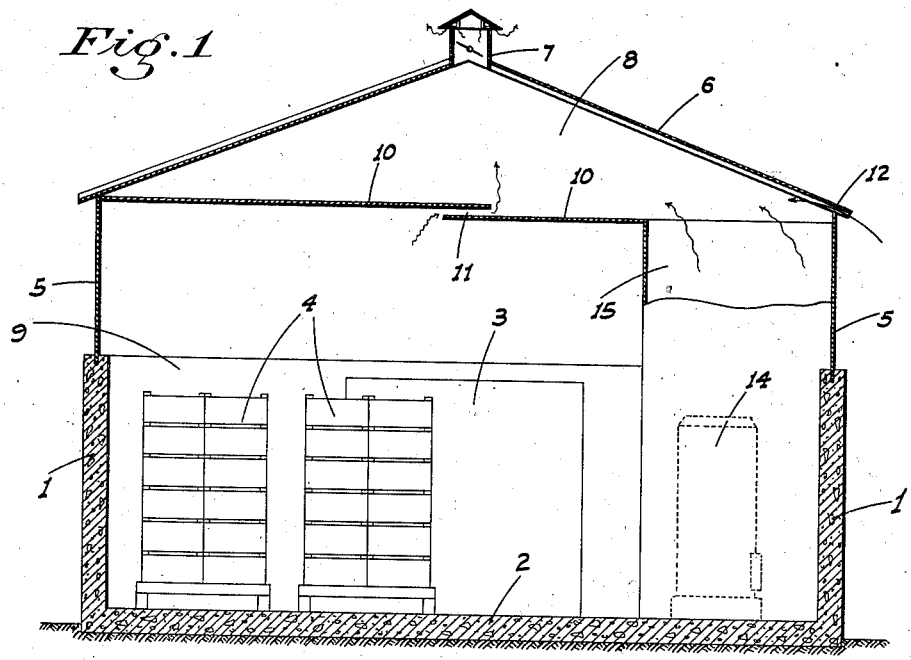
Figure 1 is a cross section of a warehouse constructed according to my invention.

The height of the wall portions 1 is not less than the desired height of the storage area, or that of a stack of boxes 4 of the produce being stored, as shown in Fig. 1.

The upper portions 5 of the walls have airtight connection with the wall portions 1, but these portions 5 are of sheet steel or similar heat conducting material. Said portions 5 extend to a junction with the roof 6, at least one side of which (the south side or that most directly facing the sun) is disposed on a suitable upward slope from the corresponding side of the warehouse, so that the roof as a whole is peaked. A row of individually controllable ventilators 7 of standard character are placed along the roof at the peak. The roof may be made of ordinary corrugated galvanized sheeting, uninsulated against heat, since heat within the attic area 8 immediately under the roof is desirable.

Figure 3:
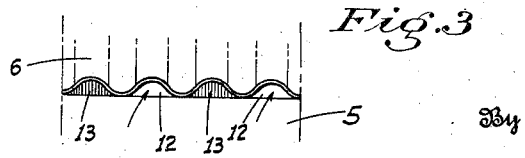
Figure 3 is a fragmentary side view, showing the venting between the roof and adjacent side wall.

Since condensation is apt to form on the under side of the roof at times, such condensation is prevented from dropping into the storage area 9 of the warehouse by a water-tight ceiling 10 disposed at the level of the top of the wall portions 5 and formed as a pair of sections overlapping each other for some distance in spaced relation approximately along the central zone of the warehouse, as shown at 11. The ceiling 10 has airtight connection with the wall portions 5 except at the space 11, but in order to allow for the constant admission of a certain amount of relatively warm, fresh air into the area 8, vents 12 are provided between the roof and wall 5 on the south side. This is conveniently done by closing up alternate ones of the openings naturally formed between the roof corrugations and said wall 5 at their junction, as shown at 13 in Fig. 3.

In operation, due to the special constructional features as above described, it will be seen that the stacked produce is disposed in a warehouse zone of quiet air entirely below the top of the heat insulated walls 1. Heat from the outside, however, is transferred into the warehouse in the zone between the ceiling 10 and the top of the walls 1 through the heat conducting walls 5, relatively heating the corresponding layer or stratum of air. This layer will naturally be warm and dry, and becoming somewhat expanded, takes in any moisture which may be present in the cool air below and due to any sweating of the produce. The air in the attic 8, being also relatively warm and also free to circulate (by reason of the vents 12 and 7) sets up a natural draft for the air below the ceiling. This air, to a certain extent, can flow into the attic between the overlapping ceiling sections 10. Of course, this flow will be very small, since there is no outside air to replenish the original quantity in the storage area, but the escape of this air made possible by the particular construction and relative heating of the upper strata of the air acts to efficiently withdraw all sweat or moisture from the produce as it forms thereon, and maintain such produce and the surrounding air in a perfectly dry and cool condition.

In the event that exterior weather conditions at any time should be such that air in the attic is not sufficiently warmed, I may provide a means for temporarily and artificially warming such air. This means, in the form of any suitable air heater unit 14 enclosed in a compartment 15 open to the attic area 8 but sealed in an air- and water-tight as well as heat insulated manner from the storage area. Access to compartment 15 is had from an exterior door as indicated at 16, so that an operator may tend the heater without entering the warehouse proper.

From the foregoing description it will be readily seen that I have produced such a warehouse as substantially fulfills the objects of the invention as set forth herein.

While this specification sets forth in detail the present and preferred construction of the warehouse, still in practice such deviations from such detail may be resorted to as do not form a departure from the spirit of the invention, as defined by the appended claim.

Having thus described my invention, what I claim as new and useful and desire to secure by Letters Patent is:

A storage warehouse for the purpose set forth and which comprises a storage area consisting of a floor and lower side walls, both such floor and walls being substantially impervious to heat and moisture, the walls projecting upwardly from the floor a predetermined distance to form a storage area of desired capacity therebetween, upper walls mounted on and generally conforming to the contour of the lower walls and having substantially air tight connection with the latter, such upper walls being of heat conducting material and forming a free air space therebetween, whereby air in such space may become heated by conduction from the outside atmosphere, the space between the lower walls being freely open into the space between the upper walls whereby as heated air is generated between the upper walls it will rise and expand and tend to draw any moisture from about produce stored between the lower walls, into the space between the upper walls, a ventilated roof above the upper walls to permit the escape of the rising warm air from the space between such upper walls, and a ceiling interposed between the upper walls and the roof, such ceiling comprising flat members disposed in overlapping spaced relation whereby to permit of free movement of air through the ceiling while forming a surface to catch any condensed moisture.

EARLE L. ROBERTS.

REFERENCES CITED

The following references are of record in the file of this patent:

UNITED STATES PATENTS

| Number | Name | Date |
|---|---|---|
| 1,157,158 | Harry | Oct. 19, 1915 |
| 1,230,305 | Klay | June 19, 1917 |
| 2,185,532 | Waterman et al. | Jan. 2, 1940 |
| 1,957,450 | Fitch | May 8, 1934 |
| 1,903,510 | Laboon et al. | Apr. 11, 1933 |
| 2,046,600 | Atkinson | July 7, 1936 |
| 2,354,292 | Waterman | July 25, 1944 |
| 95,657 | Cope | Oct. 12, 1869 |
| 2,185,760 | Altenkirch | Jan. 2, 1940 |
| 979,444 | De Armond | Dec. 27, 1910 |